(12) United States Patent
De Groot

(10) Patent No.: US 10,255,060 B2
(45) Date of Patent: Apr. 9, 2019

(54) METHOD FOR EXTENDING AN EMBEDDED SOFTWARE COMPONENT OF A FIELD DEVICE

(71) Applicant: Endress + Hauser Process Solutions AG, Reinach (CH)

(72) Inventor: Vincent De Groot, St. Louis (FR)

(73) Assignee: ENDRESS + HAUSER PROCESS SOLUTIONS AG, Reinach (CH)

( * ) Notice: Subject to any disclaimer, the term of this patent is extended or adjusted under 35 U.S.C. 154(b) by 0 days.

(21) Appl. No.: 14/910,894

(22) PCT Filed: Jul. 7, 2014

(86) PCT No.: PCT/EP2014/064463
§ 371 (c)(1),
(2) Date: Feb. 8, 2016

(87) PCT Pub. No.: WO2015/018579
PCT Pub. Date: Feb. 12, 2015

(65) Prior Publication Data
US 2016/0188322 A1 Jun. 30, 2016

(30) Foreign Application Priority Data
Aug. 6, 2013 (DE) .................... 10 2013 108 478

(51) Int. Cl.
*G06F 9/46* (2006.01)
*G06F 9/44* (2018.01)
(Continued)

(52) U.S. Cl.
CPC ......... *G06F 8/654* (2018.02); *G05B 19/0426* (2013.01); *G06F 9/44526* (2013.01);
(Continued)

(58) Field of Classification Search
CPC .............. G05B 19/0426; G05B 19/042; G05B 19/4185; G05B 19/056; G05B 19/0421;
(Continued)

(56) References Cited

U.S. PATENT DOCUMENTS 6,850,973 B1 * 2/2005 Larson ............... G05B 19/0426
700/117
7,072,987 B2 * 7/2006 Jurisch ................. G05B 19/042
700/17

(Continued)

FOREIGN PATENT DOCUMENTS

CN 1 627262 A 6/2005
CN 2774029 Y 4/2006
(Continued)

OTHER PUBLICATIONS

Judith Bishop, Componet Deployment, Jun. 20-21, 2002, [Retrieved on Oct. 9, 2018]. Retrieved from the internet: <URL: https://link.springer.com/content/pdf/10.1007%2F3-540-45440-3.pdf> 280 Pages (1-267) (Year: 2002).*

(Continued)

*Primary Examiner* — Anibal Rivera
(74) *Attorney, Agent, or Firm* — Bacon & Thomas, PLLC

(57) ABSTRACT

Method for extending an embedded software component of a field device (F), wherein an extending software component is loaded into a memory of the field device (F), wherein by means of the extending software component at least one supplemental application function is provided for the field device (F), and wherein the embedded software component and the extending software component interact, in order to execute the supplemental application function.

17 Claims, 3 Drawing Sheets

(51) Int. Cl.
*G06F 3/00* (2006.01)
*G06F 15/16* (2006.01)
*G06F 8/654* (2018.01)
*G06F 9/445* (2018.01)
*G05B 19/042* (2006.01)
*G05B 19/421* (2006.01)
*G05B 19/423* (2006.01)
*G06F 11/07* (2006.01)

(52) U.S. Cl.
CPC .......... *G05B 19/421* (2013.01); *G05B 19/423* (2013.01); *G06F 11/0721* (2013.01)

(58) Field of Classification Search
CPC ............ G05B 19/4184; G05B 19/0423; G05B 19/04; G05B 19/426; G05B 5/02; G06F 13/12; G06F 8/65; G06F 8/61; G06F 15/02; G06F 9/45508; G06F 9/485; G06F 11/0721; G06F 17/3092
See application file for complete search history.

(56) References Cited

U.S. PATENT DOCUMENTS

| | | | | |
|---|---|---|---|---|
| 7,124,239 B2* | 10/2006 | Saito | .................. | G05B 19/0426 700/75 |
| 7,707,550 B2* | 4/2010 | Resnick | ................. | G05B 15/02 717/121 |
| 7,809,811 B1* | 10/2010 | Rao | ........................ | G06F 15/173 709/221 |
| 8,402,192 B2* | 3/2013 | Kilian | .................. | G05B 19/042 710/300 |
| 8,543,741 B2* | 9/2013 | Reynolds | .......... | H04L 12/40013 709/220 |
| 8,627,307 B2* | 1/2014 | Capuozzo | ................. | G06F 8/65 717/168 |
| 8,819,656 B2 | 8/2014 | Budmiger | | |
| 8,881,133 B2 | 11/2014 | Lefebvre | | |
| 2002/0116453 A1* | 8/2002 | Todorov | .............. | H04L 41/0226 709/203 |
| 2002/0162014 A1* | 10/2002 | Przydatek | .............. | G01D 4/004 726/36 |
| 2002/0165677 A1* | 11/2002 | Lightbody | ............. | G01D 4/004 702/62 |
| 2003/0061274 A1* | 3/2003 | Lo | ........................ | G05B 19/056 709/203 |
| 2003/0061349 A1* | 3/2003 | Lo | ........................ | H04L 29/06 709/225 |
| 2003/0065459 A1* | 4/2003 | Huber | ..................... | G01D 4/004 702/62 |
| 2003/0200349 A1* | 10/2003 | Hansen | ............... | G06F 9/45508 719/315 |
| 2004/0049295 A1* | 3/2004 | Wojsznis | ............... | G05B 11/32 700/28 |
| 2004/0194101 A1* | 9/2004 | Glanzer | ................. | G05B 15/02 718/100 |
| 2004/0230323 A1* | 11/2004 | Glanzer | .................. | G05B 9/02 700/18 |
| 2004/0230899 A1* | 11/2004 | Pagnano | .............. | G06F 17/3092 715/205 |
| 2004/0254648 A1* | 12/2004 | Johnson | ............... | G05B 19/042 700/1 |
| 2005/0007249 A1* | 1/2005 | Eryurek | ............... | G05B 23/027 340/511 |
| 2005/0137719 A1* | 6/2005 | Saito | .................. | G05B 19/0426 700/5 |
| 2006/0136899 A1* | 6/2006 | Yoo | ........................ | G06F 8/61 717/168 |
| 2006/0143493 A1* | 6/2006 | Meis | ....................... | H04L 41/06 714/47.1 |
| 2006/0200658 A1* | 9/2006 | Penkethman | ............. | G06F 8/65 713/2 |
| 2007/0002045 A1* | 1/2007 | Finger | ................... | G06T 15/405 345/422 |
| 2007/0006238 A1* | 1/2007 | Finger | .................... | G06F 9/485 719/328 |
| 2007/0046467 A1* | 3/2007 | Chakraborty | ........ | G06K 7/0008 340/572.1 |
| 2007/0078530 A1* | 4/2007 | Blevins | ................ | G05B 13/041 700/29 |
| 2007/0123249 A1* | 5/2007 | Sun | .......................... | G01S 19/14 455/423 |
| 2007/0142934 A1* | 6/2007 | Boercsoek | ......... | G05B 19/4185 700/23 |
| 2007/0142939 A1* | 6/2007 | Duffy | ....................... | G06F 1/12 700/78 |
| 2007/0168057 A1* | 7/2007 | Blevins | ................ | G05B 13/022 700/53 |
| 2007/0198749 A1* | 8/2007 | Vazach | .................... | G06F 13/12 710/2 |
| 2007/0244584 A1* | 10/2007 | John | .................. | G05B 19/0421 700/86 |
| 2007/0300150 A1 | 12/2007 | Davis | | |
| 2008/0040452 A1* | 2/2008 | Rao | ......................... | H04L 1/243 709/219 |
| 2008/0065753 A1* | 3/2008 | Rao | ..................... | H04L 41/0681 709/223 |
| 2008/0082180 A1* | 4/2008 | Blevins | ................. | G05B 11/42 700/29 |
| 2008/0082294 A1* | 4/2008 | Pihlaja | ............... | G05B 23/0221 702/179 |
| 2008/0125879 A1* | 5/2008 | Miller | ................. | G05B 23/0254 700/30 |
| 2008/0126555 A1* | 5/2008 | Rao | ......................... | H04W 8/245 709/230 |
| 2008/0126679 A1* | 5/2008 | Philipps | ................ | G06F 11/076 711/103 |
| 2008/0167839 A1* | 7/2008 | Miller | ..................... | C10G 11/187 703/2 |
| 2008/0177513 A1* | 7/2008 | Miller | ................. | G05B 23/0254 703/2 |
| 2008/0188972 A1* | 8/2008 | Miller | .................. | G05B 19/4184 700/110 |
| 2008/0228908 A1* | 9/2008 | Link | ..................... | H04L 41/046 709/223 |
| 2008/0288933 A1* | 11/2008 | Budmiger | ............. | G01F 1/8431 717/168 |
| 2008/0301270 A1* | 12/2008 | John | ................. | G05B 19/0421 709/221 |
| 2008/0313254 A1* | 12/2008 | Hilemon | ............ | G05B 19/4185 709/200 |
| 2009/0049207 A1* | 2/2009 | Reynolds | .......... | H04L 12/40013 710/16 |
| 2009/0089247 A1* | 4/2009 | Blevins | ................ | G06Q 10/00 |
| 2009/0182437 A1* | 7/2009 | Frey | ...................... | G05B 19/042 700/2 |
| 2009/0210921 A1* | 8/2009 | Ramsdell | .............. | H04L 41/12 725/120 |
| 2010/0122245 A1* | 5/2010 | Igarashi | ............. | G05B 19/0426 717/170 |
| 2010/0214036 A1* | 8/2010 | Seberger | ............ | G05B 19/0423 333/32 |
| 2010/0293539 A1* | 11/2010 | Lefebvre | ............ | G05B 19/0426 717/174 |
| 2010/0306436 A1* | 12/2010 | Kilian | .................. | G05B 19/042 710/301 |
| 2011/0082569 A1* | 4/2011 | Bellville | ............ | G05B 19/0426 700/79 |
| 2011/0153089 A1 | 6/2011 | Tiemann | | |
| 2011/0153846 A1* | 6/2011 | Shamir | .................... | H04L 67/14 709/228 |
| 2011/0178650 A1* | 7/2011 | Picco | ..................... | H05B 37/0254 700/295 |
| 2012/0054541 A1* | 3/2012 | Byom | .................. | G06F 11/0721 714/6.13 |
| 2012/0062577 A1* | 3/2012 | Nixon | .................. | G05B 23/0272 345/522 |

(56) References Cited

U.S. PATENT DOCUMENTS

| | | | |
|---|---|---|---|
| 2012/0143586 A1* | 6/2012 | Vetter | G05B 19/042 |
| | | | 703/20 |
| 2013/0095864 A1* | 4/2013 | Marovets | H04W 4/14 |
| | | | 455/466 |
| 2013/0211754 A1* | 8/2013 | Herzog | G01R 22/063 |
| | | | 702/62 |
| 2014/0101653 A1* | 4/2014 | Dharmadhikari | G06F 8/65 |
| | | | 717/173 |

FOREIGN PATENT DOCUMENTS

| | | |
|---|---|---|
| CN | 1954276 A | 4/2007 |
| CN | 10 2222052 A | 10/2011 |
| DE | 102007035158 A1 | 1/2009 |
| DE | 102008012104 A1 | 9/2009 |
| DE | 102010062266 A1 | 6/2012 |
| EP | 102007021099 A1 | 11/2008 |
| EP | 2096511 A2 | 9/2009 |
| EP | 2378417 A1 | 10/2011 |
| WO | 2007149669 A2 | 12/2007 |
| WO | 2015018579 A1 | 2/2015 |

OTHER PUBLICATIONS

Thomas Genbler et al., Components for Embedded Software, Oct. 8-11, 2002, [Retrieved on Oct. 9, 2018]. Retrieved from the internet: <URL: http://delivery.acm.org/10.1145/590000/581634/p19-gessler.pdf?> 8 Pages (19-26) (Year: 2002).*

Jochen Muller et al., "Optimisation of Field Device Life-Cycle in Process Automation by a Flexible Component Based Function Management", Industrial Informatics, 2006 IEEE International Conference on, Aug. 1, 2006, pp. 120-125.

D. Krumsiek, "FDCML—Field Device Configuration Markup Language: XML basierte Geraetebeschreibung", VDI Berichte, Duesseldorf, Germany, No. 1756, Jan. 1, 2003, pp. 789-794.

English Translation of the International Preliminary Report on Patentability, WIPO, Geneva, CH, dated Feb. 18, 2016.

Second OA dated Dec. 20, 2018 in Chinese Patent Application for Invention No. 201480045040.6.

* cited by examiner

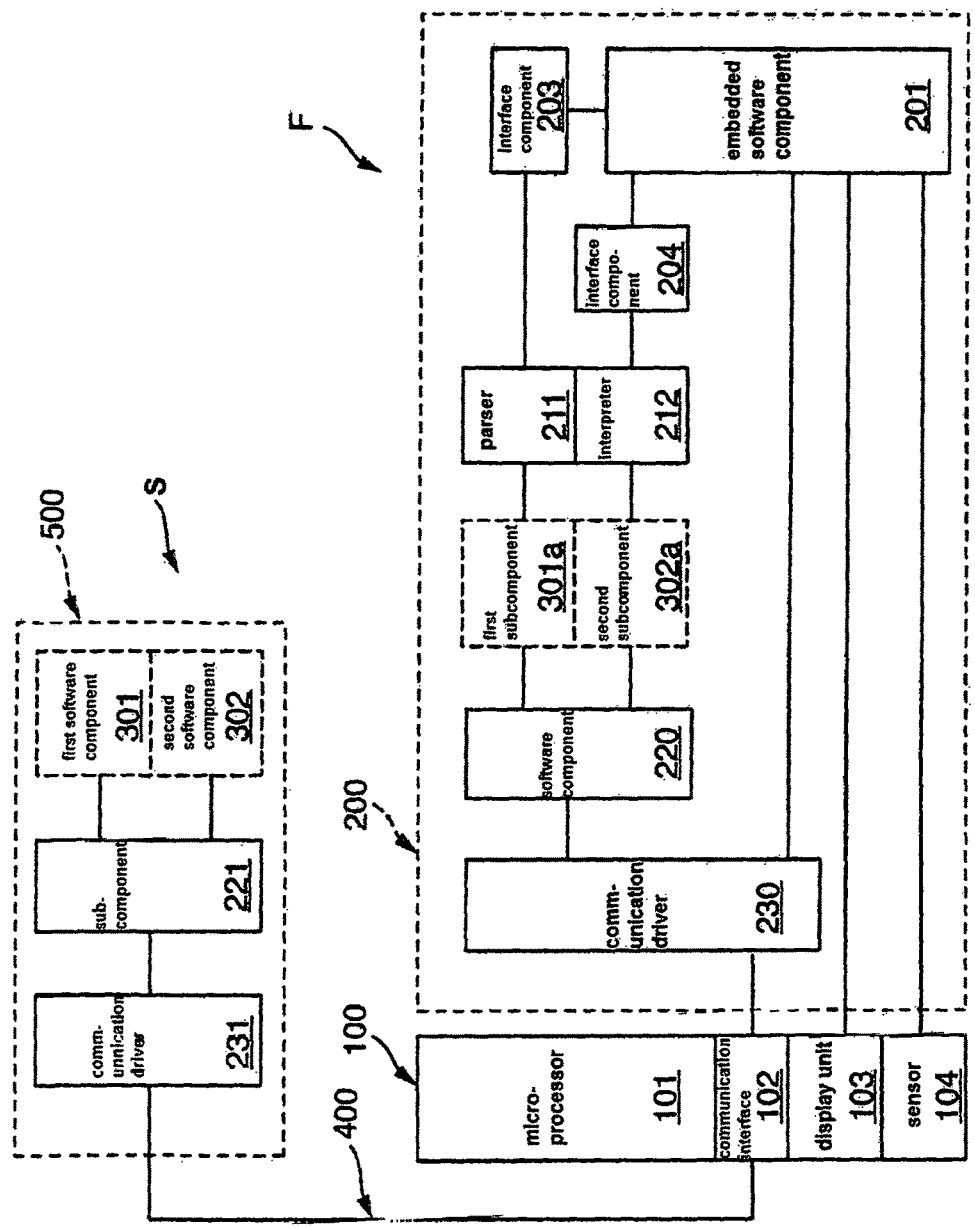

```
<device extension class="3">

<validity sensortypeid="27", sensortypeid="289"></validity>
  <parameter id="id_proc_med" type="enum" access="rw" storage="nonvolatile"
          menu="additionals">
    <label>Process medium</label>
    <enum val="1">Water</enum>
    <enum val="2">Oil</enum>
    <enum val="3">Vinegar</enum>
    <enum val="4" default="true">not specified</enum>
  </parameter>
  <parameter id="id_proc_temp" type="float" access="rw" storage="nonvolatile"
          default="20.0" menu="additionals" displayformat="%.1f">
    <label>Average medium temperature °C</label>
  </parameter>
  <parameter id="id_diag" type="int" access="r" storage="volatile" unit="%"
          menu="additionals">
    <label>Usage of sensor element</label>
  </parameter>

<manual extension>
    <Chapter id="additional functions">
      <h1>Predictive maintenance depending process properties</h1>
      The measurement instrument's predictive maintenance bases on the properties of the
      medium in contact with the sensor.
      $"id_proc_med" contains the process medium, $"id_proc_temp" contains the typical
      temperature of the process medium.
      The remaining lifetime is vizualized by $"id_diag".
    </Chapter>
  </manual extension>

</device extension>
```

Fig. 2

```
function powerOnInit() {
  fDevObjModel.register(Diagnose); /*registers the diagnose function */
} function Diagnose() {
/* the diagnose function with some detail how the parameters are obtained from the
   field device object model
*/ fDevObjModel.id_diag = function(fDevObjModel.Hours, fDevObjModel.id_proc_med,
fDevIObjModel.id_proc_temp);

} function x() {

/* this function does the calculation depending on the temperature, medium and number of
hours the device is in use, the algorithm is not necessary to understand the concept of
the technology described * /

# METHOD FOR EXTENDING AN EMBEDDED SOFTWARE COMPONENT OF A FIELD DEVICE

TECHNICAL FIELD

The invention relates to a method for extending an embedded software component of a field device. Furthermore, the invention relates to a field device, a file type, a data carrier and a data stream.

BACKGROUND DISCUSSION

Known from the state of the art, as represented, for example, by German application DE 102006005365 A1, are methods for updating the firmware of a field device. German application DE 102005018910 A1 discloses a method for equipping a software controlled device with new software code. In such case, an old version of the software is completely replaced by a new version.

Disadvantageous, in such case, is that always a complete version of the software must be transferred to the field device and stored there. This causes a higher data loading of a communication connection to the field device and a greater memory requirement in the field device. This is, however, contrary to the well-known scarcity of resources typically existing in automation technology and its field devices.

Additionally, it is not possible to expand just individual functions of a field device without completely replacing the existing firmware.

SUMMARY OF THE INVENTION

An object of the invention is to enable a flexible adapting of a field device and its functions.

The object is achieved according to the invention by a method, a field device, a file type, a data carrier and a data stream.

As regards the method, the object is achieved by a method for extending an embedded software component of a field device, wherein an extending software component is loaded into a memory of the field device, wherein by means of the extending software component at least one supplemental application function is provided for the field device, and wherein the embedded software component and the extending software component interact, in order to execute the supplemental application function.

In industrial plants, so-called field devices are often applied for controlling and/or monitoring a process running in the plant. A field device can be, for example, a sensor, an actuator, a display unit, a gateway or some other process-near component.

Such field devices are currently operated via an embedded software component, also referred to as embedded software. I.e., this software component is specifically matched to the hardware of the respective field device, in order to execute the functions of the field device, thus especially functions, which concern the operation of the field device. The embedded software component can also execute functions going beyond that, such as functions typical for application software. Such application software is typically also part of the embedded software component, which is, for example, the firmware of the field device.

While the embedded software component is thus at least responsible for the operation of the field device per se, the embedded software component can also contain application software, which thus serves to execute a function or a number of functions, which delivers or deliver, especially calculates or calculate and/or, for example, displays or display on a display unit of the field device, additional process relevant information.

By means of the extending software component, a supplemental function or a number of supplemental functions can be executed by the field device. Moreover, the extending software component can serve also to supplement or to replace functions of the embedded software component.

In a form of embodiment of the method, the supplemental application function processes process-relevant data, especially field device referenced data and/or measurement data. The field device referenced data can be, for example, parameters of the field device, which are, for example, already provided in the embedded software component and/or which are contained in the extending software component.

Thus, it is, for example, possible that, based on improved evaluating methods, other or more exact statements concerning a state of the field device or the reliability of the measured value can be made, wherein these findings are provided by the supplemental functions. For example, the application software can provide supplemental functions, such as, for example, in the case a fill level measuring device, an envelope curve.

In an additional form of embodiment of the method, the embedded software component and the extending software component interact by means of an interface component, in order to execute the supplemental application function, especially a processing of field device referenced data and/or measurement data. Thus, for example, a memory range can be provided, which contains the embedded software component, while the interface component enables data exchange or data processing between the embedded software component and the extending software component. For example, the embedded software component can be so formed that the presence of an extending software component is ascertained and, in given cases, program execution so adapted that the function contained in the extending software component is executed.

In an additional form of embodiment of the method, the embedded software component is present in a first, especially machine-readable, format. For example, the machine-readable format can be an assembler code or a binary code or a hex code.

In an additional form of embodiment of the method, the extending software component is present in a second format, which differs from the first format. The second format is a programming code, which exists, for example, in XML format.

In an additional form of embodiment of the method, the extending software component provides a supplemental application function and/or additional application data.

In an additional form of embodiment of the method, the embedded software component is the firmware of the field device.

In an additional form of embodiment of the method, the firmware includes a boot loader, an operating system and the application software. The extending software component can then, for example, provide a supplemental function of bootloader, of the operating system and/or a supplemental function of the application software of the field device.

In an additional form of embodiment of the method, the embedded software component operates the hardware of the field device.

In an additional form of embodiment of the method, the extending software component is composed of first and second subcomponents, wherein the first subcomponent includes data in the form of a meta-language, for example, XML, and the second subcomponent includes data in the form of a scripting language, for example, JavaScript.

In an additional form of embodiment of the method, the interface component includes an interface element in the form of a parser for processing the first subcomponent.

In an additional form of embodiment of the method, the interface component includes a first interface element in the form of an interpreter for processing the second subcomponent.

In an additional form of embodiment of the method, the interface component includes a second interface element in the form of an object model, by means of which the embedded software component can access application data of the first subcomponent and/or an application function of the second subcomponent.

Both the first as well as also the second interface element can additionally make use of a connection to the embedded software, on the one hand, and to the extending software component, on the other hand.

As regards the field device, the object is achieved by a field device comprising an embedded software component, wherein an extending software component is loadable into the field device, wherein the extending software component serves for performing at least one supplemental application function of field device, and wherein the embedded software component and the extending software component interact, in order to execute the supplemental application function.

The application function can, in such case, refer to the application software, which, for example, is part of the embedded software component. The application software can, however, also serve for operating the hardware of the field device.

As regards the file type, the object is achieved by a file type for extending an embedded software component of a field device, which file type is loadable into a field device, and which file type contains an extending software component, which serves for providing a supplemental application function for the field device.

In a form of embodiment of the file type, the file type contains a first subcomponent and/or a second subcomponent of the extending software component. The subcomponents can be the above mentioned subcomponents for providing data, respectively functions.

In a form of embodiment of the file type, the first subcomponent is data in the form of a meta-language and/or the second subcomponent is a scripting language.

As regards the data carrier, the object is achieved by a data carrier having a file type according to one of the preceding forms of embodiment.

As regards the data stream, the object is achieved by a data stream of a file type according to one of the forms of embodiment.

BRIEF DESCRIPTION OF THE DRAWINGS

The invention will now be explained in greater detail based on the appended drawing, the figures of which show as follows:

FIG. 1 a schematic representation of a field device and a service device connected therewith, FIG. 2 a program code example of a first subcomponent of the extending software component, and FIG. 3 a program code example of a second subcomponent of the extending software component.

DETAILED DESCRIPTION

FIG. 1 shows a schematic representation of a field device F, which is connected via a digital communication connection 400, with a servicing device S. The field device F can, for example, especially for the purpose of data transmission, be connected to the communication connection 400 and with the servicing device S.

The field device F includes an embedded software component 201, which contains parameters(values) and functions, in order, for example, to control the hardware of the field device and/or to calculate field device referenced data or measured values. This embedded software component 201 is connected, for example, via a field device internal data bus, with a sensor 104, respectively a sensor interface, so that, for example, preprocessed measured values or generally sensor referenced data or a measurement signal issued by the sensor 104 can be exchanged between the sensor 104 and the embedded software component 201. The embedded software component is implemented, as regards hardware, for example, in the form of a microprocessor 101 or a microcontroller.

In FIG. 1, the hardware components of the field device are designated with the reference character 100, while the software components of the field device F are designated with the reference character 200 and grouped within the dashed line.

The embedded software component 201 can also be connected with other components of the field device F, such as, for example, a display unit 103. The data connection with the sensor 104, respectively the sensor interface, can also be only a unidirectional data connection, in the case of which data, respectively a measurement signal, can be transmitted only in one direction, i.e. from the sensor 104 to the embedded software component 201.

The embedded software component 201 serves thus for controlling the hardware and for performing functions of the field device, such as, for example, displaying on the display unit or processing a measurement signal delivered from a sensor.

The embedded software component 201 can additionally be directly connected with a software component in the form of communication driver 230. Alternatively, this communication driver can also be integrated into the embedded software component 201. In this day and age, it is, however, known to deploy the communication driver, for example, via a fieldbus, to hardware serving mainly for communication.

The communication driver 230 serves to transmit, respectively to receive, data to and from the field device F via the communication connection 400, which is, for example, a fieldbus. As regards hardware, this is executed by a communication interface 102.

In the form of embodiment in FIG. 1, the communication driver 230 is connected with a software component 220 serving for encryption and/or authentication and parallel thereto with the embedded software component 201.

By means of the communication driver 230, thus, data received via the communication interface 102 can be written into a memory unit provided for storing a first subcomponent 301*a* and a second subcomponent 302*a* of an extending software component. Alternatively thereto, the software components 301*a*, 302*a* can also be omitted and/or the extending software component can have only one subcomponent.

The first subcomponent 301*a* can be, for example, additional data, which are provided to the field device F, respectively to the embedded software component. 201 and an application software contained therein. In this regard, a first data format, such as, for example, XML, can be utilized.

The second subcomponent 302*a*, on the other hand, can contain, for example, a supplemental application function, which supplements or replaces the function of the embedded software component 201. For such purpose, for example, a second data format, such as, for example, a programming language, especially JavaScript, can be present.

Alternatively, only one of the two subcomponents 301a, 302a can be provided or the two subcomponents can be joined to one.

For preprocessing, respectively for interpreting, the data contained in the subcomponents 301a, 302a, on the one hand, a parser 211 is provided, which serves for processing the first subcomponent 301a into data readable by an interface component 203. Interface component 203 serves for data exchange between the parser 211, respectively the first subcomponent 301a, and the embedded software component 201 and the therein contained application function(s).

Additionally, an interface component 204 can be provided, which provides the functions of the second subcomponent 302a by means of an object model of the embedded software component 201. This interface component 204 is connected with an interpreter 212, which, in turn, is connected with the second subcomponent 302a, in which according to the example of an embodiment in FIG. 1 a JavaScript code is contained. The embedded software component processes the data provided by the parser, respectively the interpreter, and thus executes the function defined thereby. The result of performing the function can then be transmitted via the communication interface 102 of the field device to the servicing device S or to a superordinated unit.

Thus, the embedded software component 201 of the field device F can, on the one hand, be provided with functions and, on the other hand, with additional data By means of the embedded software component 201, it is possible therewith in the course of operating a field device F subsequently also to add supplemental functions.

As already mentioned, the field device has a communication connection with a servicing device S. The first and second software components 301, 302 can be kept in this servicing device S for transmission to the field device F. In such case, it is a copy of the extending software component 301a, 302a that is sent to the field device.

Thus, certain additional data and/or functions can be transmitted to the field device in the form of a first and/or a second subcomponent 301a, 302a of an extending software component, for example, upon a customer request or due to an arisen need in the plant, in which the field device F is installed, or in view of a new software version.

The extending software component 301a, 302a can be stored in the form of a file, for example, on a data carrier. In such case, the first subcomponent 301a of the extending software component can be provided in a first data format and the second subcomponent 302a in a second data format.

These subcomponents 301a, 302a can be fed to a component serving for encryption and authentication. This subcomponent 221, which is optionally provided, is, in turn, connected with a communication driver 231, which serves for data transmission via the communication connection 400. Therefore, data can be transmitted from the servicing device 500 to the field device or received by the servicing device 500 from the field device. In FIG. 1, in such case, the software components of the service device 500 are contained within a dashed line.

FIG. 2 shows an example of a first subcomponent 301, 301a of the extending software component, which is present in the XML data format. The extending software component can, in such case, be divided into different classes, here "class="3"". For the different classes, which essentially reflect different application scenarios of the invention, see below. In the present case, the subcomponent 301, 301a contains specifications as regards the validity of the subcomponent as a function of the sensor with which it can be used. Here, the subcomponent should be valid and applicable only in connection with sensors of a certain type, here types "27" and "289".

The additional parameters relate to the process medium. In the present case, one distinguishes, by way of example, between water, oil, and vinegar.

Additionally, handbook information "manual extension" concerning these parameters is to be loaded into the field device. In FIG. 2, this is the information belonging to these parameters concerning the predictive maintenance of the sensor as a function of the process medium.

Instead of the XML format used here, also other data formats can be used.

FIG. 3 shows an example of a second subcomponent 302, 302a of an extending software component. This subcomponent 302, 302a contains, in the form of JavaScript code, supplemental functions, which can be executed by a field device. Instead of JavaScript code, also other programming languages can be used, such as, for example, the EDDL familiar in process automation.

In the present example, the second subcomponent 302, 302a contains a diagnostic function "function diagnosis ( )", which is not specified in greater detail here. In the example of an embodiment in FIG. 3, the diagnostic function obtains the parameters "fDevObjModel.hours", "fdevObjModel.id_proc_med" and "fDevObjModel.id_proc_temp", thus parameters, which specify the number of operating hours of the field device, the process medium and the process temperature. The corresponding parameters for the process medium and the process temperature are contained in the first subcomponent 301, 301a of the extending software component.

The embedded software component 201 of the field device can thus now execute supplementally to the previous functions also the present diagnostic function. Instead of the here discussed example of a sensor, the extending software component can also serve for extending functions of an actuator, such as a, for example, a valve, or for extending functions of a display unit or even a gateway. Thus, the invention provides the ability to extend data and functions of a field device.

The invention can thus also be applied to perform a state monitoring (condition monitoring) of the state of a field device F. Especially, a state monitoring already implemented in a field device F can, for example, be adapted to new findings as regards wear or probability of failure.

Furthermore, the invention can be applied to adapt a calibrating of the field device F (to supplemental parameters desired in the future). Additionally, the invention can be applied in the case of a field device replacement or in order to optimize the process in a plant. This, in turn, can then lead to a savings of installed resources, for example, in the form of less energy consumption, less waste products, or less CO2 production.

In such case, a number of scenarios for extending the embedded software component 201 can occur. The extending, for example, in the form of parameters, cannot be interpreted by the embedded software component 201, but, instead, is processed by other instances, such as, for example, a servicing device S or a superordinated unit. The accessing occurs, however, via the embedded software component 201, such as, for example, the firmware, of the field device F. The information can be, for example, the location coordinates of the field device F and/or encrypted data (which should not be accessible at the field device level anyway).

The data provided by means of the extending software component 301,302, 301a, 302a can in another scenario be shown and edited on a display unit of the field device F. This can be utilized, for example, for parametering the field device (especially as concerns parameters in the extending software component).

In a third scenario, finally, there can be provided by means of the extending software component 301,302, 301a, 302a also other functions, which are then executed by the field device F. In this way, the functionality of the field device F can be expanded. Such can involve, for example, the diagnostic function treated in the example of an embodiment in FIGS. 2 and 3.

The extending software components 301,302, 301a, 302a can also be utilized to integrate a field device with such an extending software component 301,302, 301a, 302a into a control system for controlling a plant.

The invention claimed is:

1. A method for extending an embedded software component of a field device, comprising the steps of:
    loading an extending software component into a memory of the field device;
    providing by means of the extending software component at least one supplemental application function for the field device; and
    interacting the embedded software component and the extending software component, in order to execute the supplemental application function, wherein:
    said embedded software component is embodied to ascertain a presence of said extending software component and to adapt the program execution in order to execute said function contained in said extending software component;
    the field device is connected with a servicing device, which contains the extending software component, a component serving for encryption and authentification connected with a communication driver; and
    the extending software component is fed to the component serving for encryption and authentification and transmitted from the servicing device to the field device.

2. The method as claimed in claim 1, wherein:
    said at least one supplemental application function processes process-relevant data, especially field device referenced data and/or measurement data.

3. The method as claimed in claim 1, wherein:
    the embedded software component and the extending software component interact by means an interface component, in order to execute said at least one supplemental application function, especially a processing of field device referenced data and/or measurement data.

4. The method as claimed in claim 1, wherein:
    the embedded software component is present in a first format, especially a machine-readable format.

5. The method as claimed in claim 4, wherein:
    the extending software component is present in a second format, which differs from the first format.

6. The method as claimed in claim 1, wherein:
    the extending software component provides said at least one supplemental application function and/or additional application data.

7. The method as claimed in claim 1, wherein:
    the embedded software component is the firmware of the field device.

8. The method as claimed in claim 7, wherein:
    the firmware includes a boot loader, an operating system and an application software.

9. The method as claimed in claim 7, wherein:
    the embedded software component operates the hardware of the field device.

10. The method as claimed in claim 1, wherein:
    the extending software component is composed of first and second subcomponents, the first subcomponent includes data in the form of a meta-language, and the second subcomponent includes data in the form of a scripting language.

11. The method as claimed in claim 3, wherein:
    the interface component includes an interface element in the form of a parser for processing a first subcomponent.

12. The method as claimed in claim 11, wherein:
    the interface component includes an interface element in the form of an interpreter for processing a second subcomponent.

13. The method as claimed in claim 3, wherein:
    the interface component includes an interface element in the form of an object model(-interface), by means of which the embedded software component can access application data of a first subcomponent and/or an application function of a second subcomponent.

14. A field device having a processor, comprising:
    an embedded software component;
    an extending software component loadable into the field device; said extending software component serves for performing at least one supplemental application function of the field device and said embedded software component and said extending software component interact, in order to execute the supplemental application function, wherein:
    the field device is connected with a servicing device, which contains the extending software component, a component serving for encryption and authentification connected with a communication driver; and
    said extending software component is fed to the component serving for encryption and authentification and transmitted from the servicing device to the field device.

15. A file type embedded in a memory for extending an embedded software component of a field device, the extension comprising the steps of: loading an extending software component into a memory of a filed device; providing by means of the extended software component at least one supplemental application function for the field device; and interacting the embedded software component and the extending software component, in order to execute the supplemental application function, wherein said embedded software component is embodied to ascertain a presence of said extending software component and to adopt the program execution in order to execute said function contained in said extending software component; the field device is connected with a servicing device, which contains the extending software component, a component serving for encryption and authentication connected with a communication driver, and the extending software component is fed to the component serving for encryption and authentication and transmitted from the servicing device to the field device, said file type is loadable into a field device, and said file type contains an extending software component, which serves for providing a supplemental application function for the field device.

16. The file type as claimed in claim 15, wherein:
the file type contains a first subcomponent and/or a second subcomponent of the extending software component.

17. The file type as claimed in claim 15, wherein:
said first subcomponent is data in the form of a meta-language and/or wherein said second subcomponent is a scripting language.

* * * * *